Patented Aug. 10, 1926.

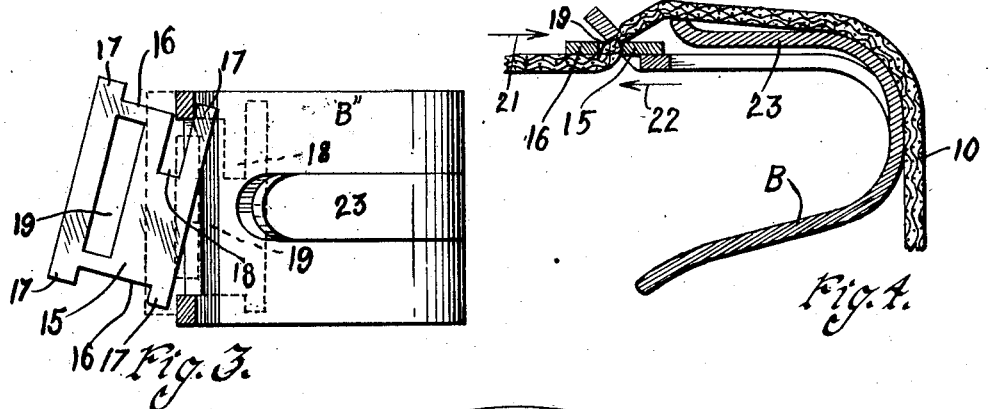
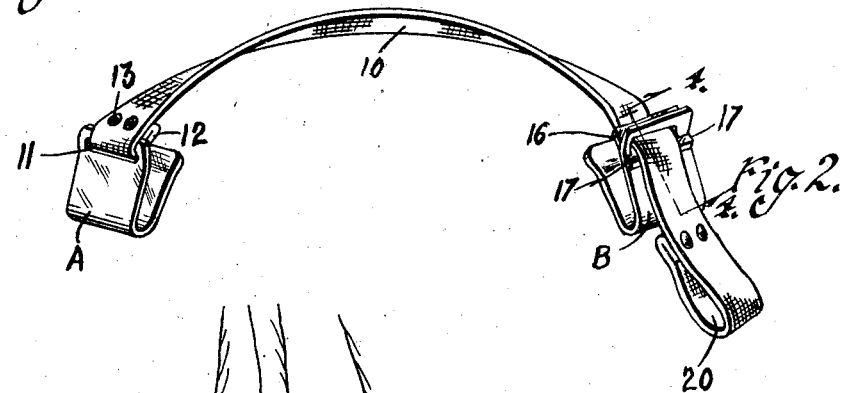
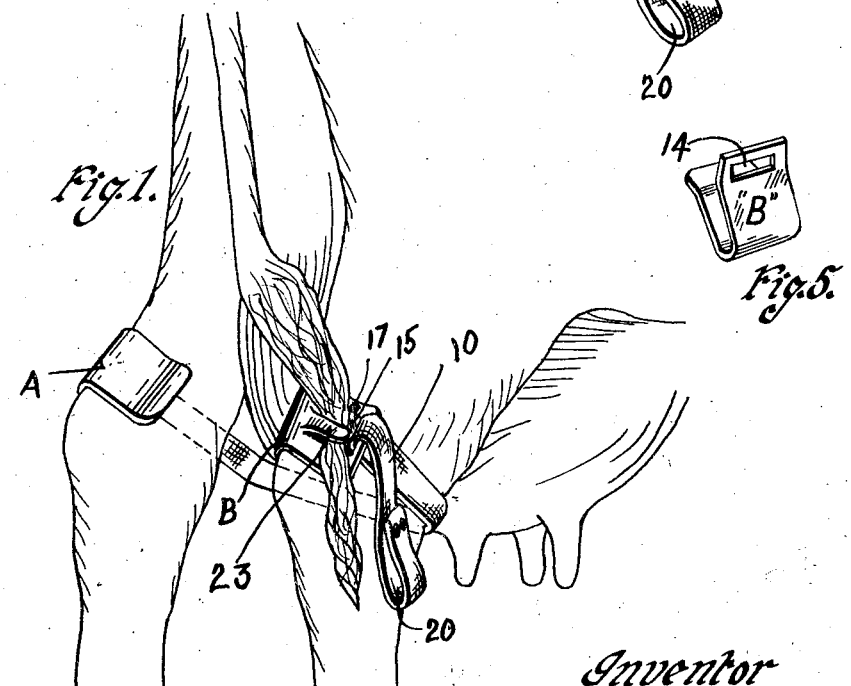

1,595,254

UNITED STATES PATENT OFFICE.

NIELS C. SIMONSEN, OF SIOUX RAPIDS, IOWA.

COW HOPPLE.

Application filed March 17, 1926. Serial No. 95,257.

The object of my invention is to provide a cow hopple of simple, durable and comparatively inexpensive construction.

More particularly it is my object to provide a cow hopple including a pair of members adapted to engage the tendons of the legs of the cow and connected together adjustably by a flexible element or web belting so that when the belting is extended against the legs of the cow there will be no possibility of injury to the legs as might be caused if chains or other metal fastenings were used.

Still a further object is to provide a connection between the two leg engaging members which is flexible and which can easily and quickly be engaged for drawing the two leg engaging members together and the flexible connecting member therebetween in a taut position around the fore part of the animal's legs.

Still a further object is to provide a catch which permits free and easy movement of the flexible connecting member in one direction and which serves as a lock for holding the flexible connecting member or belting in any of its adjusted or drawn positions.

Still a further object is to provide in the closure member a notch in one of its side edges wherein it may be inserted in a slot formed in one of the leg engaging members and when the flexible connecting member is extended through the locking member the parts will remain in an assembled position thereafter.

Still a further object is to provide upon one of the leg engaging members a clip which serves as a cow tail holder.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1, is a perspective view of my improved cow hopple shown in position upon the hind legs of a cow.

Figure 2, is a perspective view of the cow hopple.

Figure 3, is a detail sectional view through portions of one of the leg engaging members illustrating the locking device for the belting.

Figure 4, is a sectional view taken on line 4—4 of Figure 2 showing the locking feature; and Figure 5, is a perspective view of one of the leg engaging members.

In the accompanying drawings I have used the reference characters A and B to indicate the two leg engaging members which are adapted to extend around and engage the tendons of the cow's hind legs.

The two leg engaging members A and B are designed to be connected together by a web belting or other flexible element 10.

The leg engaging member A is formed with a slot 11 near one of its ends through which is extended one end of the web belting 10. The extended end of the belting 10 as at 12 is doubled upon itself and then riveted to the belting 10 by means of the rivets or the like 13, thus holding the belting 10 to the leg engaging member A.

The leg engaging member A is substantially V shaped in cross section and is of such shape as to easily fit the tendons of a cow's hind leg. The extreme ends of the V shaped member are bowed outwardly so as to make the member more readily placed upon the tendon of the cow's leg and to avoid any possible injury to the cow's leg when the member is placed thereon.

The member B which is similar to the member A is formed with an opening 14 slightly larger than the opening 11 in the member A.

The belting 10 is extended through the opening 14 in the manner I will hereafter more fully describe.

In order to lock the belting relative to the member B I provide a locking plate 15 which is designed to be received in the openings 14 in the member B.

The locking plate 15 is formed with a pair of notches 16 in its ends so as to form spaced projections 17 on each end of the plate 15.

The length of the plate between the notches 16 is of substantially the same length as the length of the slot or opening 14.

In order to insert the plate 15 in the opening 14, I provide a comparatively deep notch or slot 18 in the plate 15 and this slot 18 receives a portion of the member B and permits the projection 17 on the far side thereof to pass through the opening 14 and thereafter the plate 15 may be straightened out and the material on each side of the opening 14 received in the notches 16.

In Figure 3 of the drawings I have shown the plate 15 in a slightly inclined position showing the position it assumes as it is being inserted in place in the opening 14.

In dotted line position I have shown the plate 15 in the position it normally takes. The slot 18 is only used when the plate 15 is being inserted in the opening 14 or removed therefrom.

The plate 15 is formed with a slot 19 through which is extended the belting 10. The belting 10 extends through the slot 19 and through the slot 14 and has its free end doubled upon itself so as to form a loop 20.

After the plate 15 has once been placed in position and the belting 10 threaded therethrough, the parts will remain in position where it will be almost impossible to have the slot or notch 18 engaged around a portion of the material of the member B. This is due to the fact that the belting 10 prevents any shifting or twisting of the member 15 within the slot 14 so long as the belting remains therein.

The belting may be drawn through the slot 19 and through the slot 14 in the direction indicated by the arrow 21 without any interference.

When the belting is drawn in the opposite direction or the members A and B are pulled away from each other, then the plate 15 moves in the direction indicated by the arrow 22 causing the belting 10 therein to be carried therewith until the belting engages the upper edge of the slot 14 as clearly indicated in Figure 4 of the drawings. The belting is wedged between the upper edge of slot 14 and the plate 15. This serves to retain the belting in this position until the plate 15 is moved in the direction indicated by the arrow 21 at which time the belting is no longer wedged.

The locking plate when no tension or pull is applied thereon will permit the belting 10 to easily slide therethrough.

The member A or the member B may have a clip 23 formed therefrom which is used for engaging the cow tail and holding it while the cow is being milked.

The belting 10 which connects the two members A and B together extends forwardly from the members A and B and around the fore part of the cow's hind legs.

The belting 10 does not in any way injure the cow's leg and permits very fine adjustment of the members A and B upon the cow's leg due to the fact that the locking plate 15 may be operated at any position on the belting 10.

It will be understood that while I have referred to the belting 10 as of web or woven material that leather or any other fabricated material may be used as a belting.

Some chnges my be made in the construction and arrangement of the various parts of my invention, without departing from the real spirit and purpose of my invention; and it is my intention to cover by my claims, any modified forms of structure or use of mechanical equivalents, which may be reasonably included within their scope.

I claim as my invention.

1. A cow hopple comprising a pair of leg engaging members adapted to engage the legs of a cow, a belting for connecting said pair of members together, one end of said belting being fiexd to one of said members and the other being slidable through a slot in the other of said members, means for holding said belting in said slot against sliding, said means including a locking plate slidable in said slot, said belting engaging said plate and adapted when moved in one direction to cause the plate to slide therewith causing the belting to be wedged between said member and said plate, said belting serving to guide and retain the plate in position in said slot.

2. A cow hopple comprising a pair of leg engaging members adapted to engage the legs of a cow, a belting for connecting said pair of members together, one end of said belting being fixed to one of said members and the other being slidable through a slot in the other of said members, means for holding said belting in said slot against sliding, said means including a locking plate slidable in said slot, said plate having a slot therein with the belting extended therethrough, said belting engaging said plate and adapted when moved in one direction to cause the plate to slide therewith causing the belting to be wedged between said member and said plate, said belting serving to guide and retain the plate in position in said slot.

3. A cow hopple comprising a pair of leg engaging members adapted to engage the legs of a cow, a belting for connecting said pair of members together, one end of said belting being fixed to one of said members and the other being slidable through a slot in the other of said members, means for holding said belting in said slot against sliding, said means including a locking plate slidable in said slot, said plate having a notch in each end forming a pair of spaced projections on each end, said projections adapted to normally retain the plate within said slot and permit some sliding movement of the plate, said plate having a notch in one end formed in the bottom of said first notch whereby the plate may be inserted in the slot in said leg engaging member and means of connection between said plate and belting for retaining the plate against accidental displacement within said slot.

4. A cow hopple comprising a pair of leg engaging members adapted to engage the legs of a cow, a belting for connecting said pair of members together, one end of said belting being fixed to one of said members and the other being slidable through a slot in the other of said members, means for holding said belting in said slot against sliding, said means including a locking plate slidable in said slot, said plate having a notch in each end forming a pair of spaced projections on each end, said projections adapted to normally retain the plate within said slot and permit some sliding movement of the plate, said plate having a notch in one end formed in the bottom of said first notch whereby the plate may be inserted in the slot in said leg engaging member and said belting extending through a slot in said plate whereby the plate will be retained against displacement from said leg engaging member.

NIELS C. SIMONSEN.